F. A. WECKERT.
SPRING WHEEL.
APPLICATION FILED AUG. 23, 1913.
1,103,332.
Patented July 14, 1914.
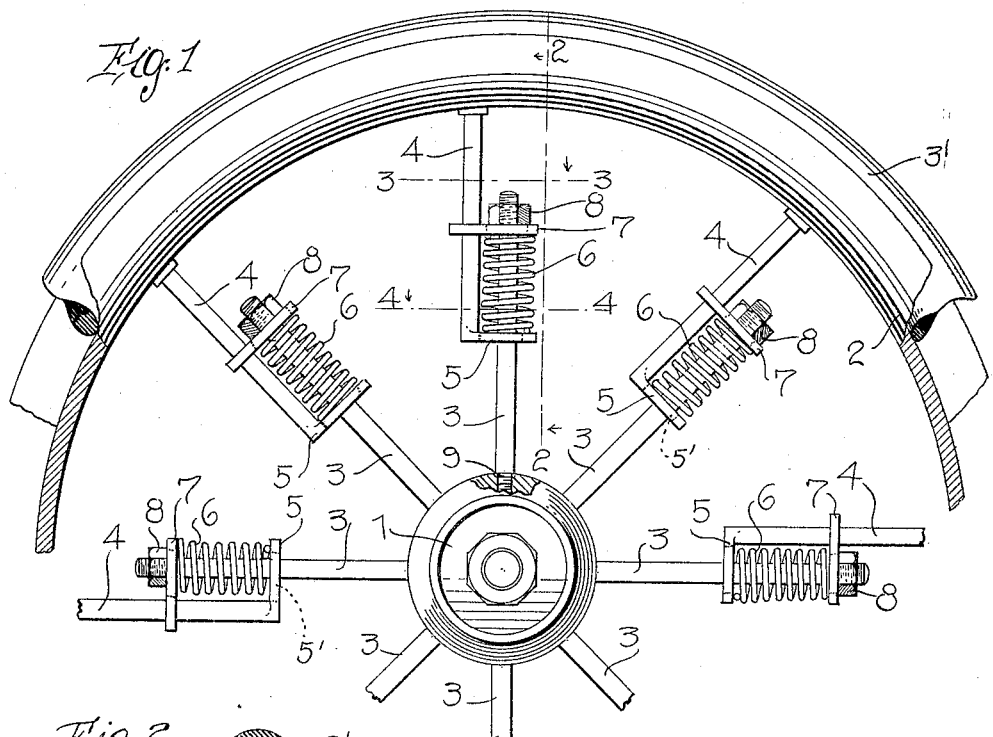
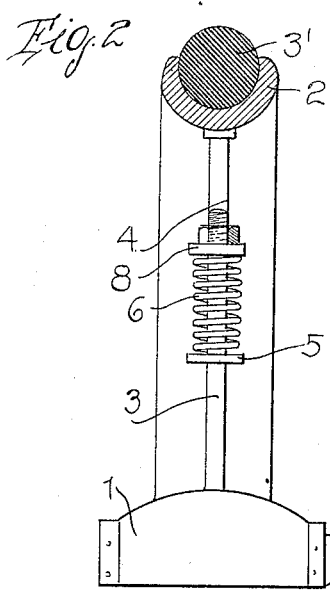
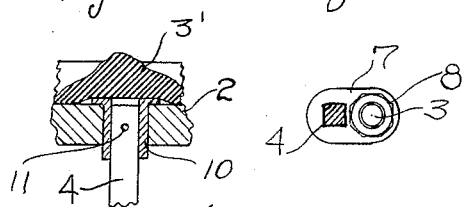
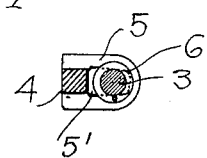
Witnesses
Robert M. Sutphen.
V. J. Dowrick.
Inventor
Frank A. Weckert
By Watson E. Coleman
Attorney

UNITED STATES PATENT OFFICE.

FRANK A. WECKERT, OF SOLON SPRINGS, WISCONSIN.

SPRING-WHEEL.

1,103,332.

Specification of Letters Patent. Patented July 14, 1914.

Application filed August 23, 1913. Serial No. 786,302.

*To all whom it may concern:*

Be it known that I, FRANK A. WECKERT, a citizen of the United States, residing at Solon Springs, in the county of Douglas and State of Wisconsin, have invented certain new and useful Improvements in Spring-Wheels, of which the following is a specification, reference being had to the accompanying drawings.

This invention relates to new and useful improvements in spring wheels and has for its object to provide a device of this character which is adapted to supersede the present pneumatic tire used in connection with vehicle wheels of all kinds.

A further object of the invention resides in providing a device of this character which will be equally as and in many respects more resilient than the pneumatic tires now in use on vehicle wheels.

A still further object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claim.

In the accompanying drawing forming a part of this application, Figure 1 is a fragmentary side elevation of a wheel embodying my improvements. Fig. 2 is a vertical section therethrough, as seen on line 2—2, Fig. 1. Fig. 3 is a horizontal section through the same as seen on line 3—3, Fig. 1. Fig. 4 is a horizontal section as seen on line 4—4, Fig. 1; and Fig. 5 is an enlarged detail sectional view showing the manner of securing the outer spoke sections in the rim.

In describing my invention, I shall refer to the drawing in which similar reference characters designate corresponding parts throughout the several views and in which—

1 indicates the hub and 2 the rim of my improved wheel, said rim being adapted to receive thereon, in any desired manner, the tire 3', preferably of a solid type.

My invention primarily contemplates the provision of a yielding means between the hub and the rim which will act as spokes therebetween and, at the same time, provide for the resiliency necessary. To this end, I provide spokes which comprise the sections 3 and 4, the former being secured to and radiating from the hub and the latter secured to the inner periphery of the rim and acting as complementary sections to the spoke sections 3. The outer sections 4 of the spokes have the free ends thereof bent angularly, as shown at 5 and each angular portion is provided with a slot 5' to receive the inner spoke sections 3, it being particularly noted that the slots 5' are elongated in a direction transversely of the spoke sections 3 and are of a length as clearly illustrated in Fig. 4 and indicated in dotted lines in Fig. 1, greater than the diameter of the inner spoke sections 3, whereby the inner spoke sections will be permitted to have not only a longitudinal movement through the slots 5' but also a rocking or transverse movement therein. Coiled springs 6 encircle the projecting portions of the inner spoke sections 3 and bear at their inner ends against the laterally disposed inner end of the outer spoke sections 4, the outer ends of said springs bearing against the washers 7 which are mounted on the outer ends of the inner spoke sections 3 and through which the outer spoke sections 3 slide. Nuts 8 engage the washers 7 and it is obvious from this construction that the tension of the springs 6 may be adjusted through the medium of the nuts and washers. The wheel is kept "true" by merely adjusting these nuts and should, at any time, the springs become unduly worn, the tension thereof may be readily adjusted or entirely new springs placed in their stead.

It must be here stated that the inner spoke sections 3 have the inner ends thereof threaded into the hub 1, as shown at 9. The outer ends of the outer sections of the spokes, however, are received in sockets 10 which are entered through the rim from the outside, each socket being provided with a peripheral flange or shoulder at its outer end to limit the inward movement of the same in the rim and a bolt or pin 11 is extended through each socket and the outer end of each spoke received therein to secure the same in position. This structure is clearly shown in Fig. 5 of the drawing.

From the foregoing description of the construction of my improved device, the operation thereof will be readily understood and it will be seen that I have provided a simple, inexpensive and efficient means for carrying out the objects of the invention.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what is claimed is:—

A spring wheel, comprising a hub, a rim, inner spoke sections secured to the hub and extending outwardly in a radial direction therefrom and washers secured to the outer ends of the inner spoke sections, outer spoke sections secured to the rim and extending inwardly therefrom in a radial direction, said outer spoke sections being formed at their inner ends with laterally disposed extremities formed with laterally elongated slots, the inner spoke sections being received in said slots and said slots being of a greater length than the diameter of the inner spoke sections, the outer spoke sections being mounted to slide through the washers, and coiled springs encircling the outer spoke sections and interposed between the washers and the angularly disposed inner ends of the outer spoke sections, for the purpose specified.

In testimony whereof I hereunto affix my signature in the presence of two witnesses.

FRANK A. WECKERT.

Witnesses:
E. S. COSGROVE,
M. A. BURKE.

Copies of this patent may be obtained for five cents each, by addressing the "Commissioner of Patents, Washington, D. C."